(12) United States Patent
Shidore et al.

(10) Patent No.: US 11,933,528 B2
(45) Date of Patent: Mar. 19, 2024

(54) METHODS AND SYSTEMS FOR DETERMINING PHASE STATE OR SUBCOOLING STATE (71) Applicant: GM GLOBAL TECHNOLOGY OPERATIONS LLC, Detroit, MI (US)

(72) Inventors: Neeraj S Shidore, Novi, MI (US); Min Sun, Troy, MI (US); Ryan D Hopper, Ferndale, MI (US); Cameron Paul Smith, Milford, MI (US)

(73) Assignee: GM GLOBAL TECHNOLOGY OPERATIONS, LLC, Detroit, MI (US)

( * ) Notice: Subject to any disclaimer, the term of this patent is extended or adjusted under 35 U.S.C. 154(b) by 35 days.

(21) Appl. No.: 17/456,999

(22) Filed: Nov. 30, 2021

(65) Prior Publication Data
US 2023/0168014 A1    Jun. 1, 2023

(51) Int. Cl.
*F25B 49/02* (2006.01)
*G01N 9/26* (2006.01)

(52) U.S. Cl.
CPC .............. *F25B 49/02* (2013.01); *G01N 9/26* (2013.01); *F25B 2700/191* (2013.01)

(58) Field of Classification Search
CPC ........ F25B 49/02; F25B 2700/19; G01N 9/26
See application file for complete search history.

(56) References Cited

U.S. PATENT DOCUMENTS

2005/0138936 A1* 6/2005 Dub .................. F25B 5/02
62/81
2010/0049338 A1* 2/2010 Schmitt .................. F24F 1/42
165/104.19

FOREIGN PATENT DOCUMENTS

JP      H06117736 A      4/1994
WO   WO-2019053858 A1 *   3/2019   .............. F25B 1/00

OTHER PUBLICATIONS

Ishikawa, Refrigeration cycle apparatus and refrigeration apparatus, 2017, Full Document (Year: 2017).*

* cited by examiner

*Primary Examiner* — Nael N Babaa
(74) *Attorney, Agent, or Firm* — Lorenz & Kopf, LLP (57) ABSTRACT Methods and systems provided for determining a phase state and/or for determining a degree of subcooling in a fluid. An exemplary method for operating a refrigeration cycle includes flowing a refrigerant through a metering device and calculating a pressure differential of the refrigerant across the metering device. Further, the method includes determining whether the refrigerant is a saturated liquid based on the pressure differential. The method includes, when the refrigerant is not a saturated liquid, cooling the refrigerant upstream of the metering device.

18 Claims, 5 Drawing Sheets

METHODS AND SYSTEMS FOR DETERMINING PHASE STATE OR SUBCOOLING STATE

INTRODUCTION

The technical field generally relates to the phase state of a fluid near and at the saturated-liquid line, and more particularly relates to the determination of the phase state and/or the subcooling state of a fluid.

Fluid phase state behavior at various pressures and enthalpies is well known. Certain processes use the latent heat of vaporization to exchange heat to selectively provide heating or cooling as desired. For example, refrigeration systems typically use a heat pump scheme that compresses a refrigerant to a relatively high temperature/high pressure vapor state, condenses the refrigerant to a relatively medium temperature/high pressure liquid state; expands the refrigerant to a relatively low temperature/low pressure mixed vapor/liquid state; and evaporates the refrigerant to a relatively medium temperature/low pressure vapor state before repeating the cycle. Heat can be emitted from the cycle during condensing and/or absorbed from the cycle during evaporation.

Ideally, the refrigerant is initially a saturated liquid, i.e., as a single-phase liquid with no vapor present, when introduced to the expansion device. However, due to process conditions, the refrigerant may remain in a two-phase state (liquid and vapor) after being condensed. In other words, the refrigerant may not be fully condensed by the condenser. This may occur due to ambient conditions of temperature or humidity. However, the expansion process does not work as effectively when the refrigerant is in the two-phase state.

Therefore, it would be beneficial to determine the state of the refrigerant when entering the expansion device. In addition, it may be beneficial to know whether, and by what degree, a fluid is subcooled. For example, in certain systems, subcooling may increase the refrigeration effect by reducing the throttling loss at no additional specific work input. Also, subcooling may ensure that only liquid enters into the expansion device leading to its efficient operation. A practical advantage of subcooling is that there is less vapor at the inlet to the evaporator which leads to lower pressure drop in the evaporator.

Accordingly, it is desirable to provide a method and system for determining the phase state of a fluid and/or the degree of subcooling of the fluid, i.e., the distance from the saturated-liquid line of a fluid. In addition, it is desirable to provide a method and system for determining the degree of subcooling of a fluid, i.e., how far beyond the saturated-liquid line that the fluid is cooled. Furthermore, other desirable features and characteristics will become apparent from the subsequent detailed description and the appended claims, taken in conjunction with the accompanying drawings and the foregoing technical field and background.

SUMMARY

Methods and systems provided for determining a phase state and/or for determining a degree of subcooling in a fluid.

A method is provided for operating a refrigeration cycle. In one embodiment, the method includes flowing a refrigerant through a metering device and calculating a pressure differential of the refrigerant across the metering device. Further, the method includes determining whether the refrigerant is a saturated liquid based on the pressure differential. The method includes, when the refrigerant is not a saturated liquid, cooling the refrigerant upstream of the metering device.

In certain embodiments, the metering device is an expansion valve having an inlet and an outlet. In such embodiments, calculating the pressure differential of the refrigerant across the metering device includes measuring an inlet pressure of the refrigerant at the inlet and measuring an outlet pressure of the refrigerant at the outlet. Further, in such embodiments, determining whether the refrigerant is a saturated liquid based on the pressure differential includes estimating a density correction factor Δ from equation (1):

$$m = A\sqrt{2(1+\Delta)\rho(P\text{in}-P\text{out})}$$

where: m is the expansion valve mass flow rate; A is the expansion valve effective flow area; ρ is the liquid refrigerant density at saturation condition; $P_{in}$ is the pressure at the expansion valve inlet; and $P_{out}$ is the pressure at the expansion valve outlet.

In certain embodiments, determining whether the refrigerant is a saturated liquid based on the pressure differential may include querying whether the density correction factor Δ is less than 0, and, when the density correction factor Δ is less than 0, determining that the refrigerant is not a saturated liquid.

In certain embodiments, estimating the density correction factor Δ comprises estimating the density correction factor Δ based on an estimation algorithm.

In certain embodiments, the refrigeration cycle includes a compressor having a compressor flow rate, and the expansion valve mass flow rate is assumed to be equal to the compressor flow rate.

In certain embodiments, the expansion valve effective flow area is calibrated.

In certain embodiments, no measurement of temperature of the refrigerant is obtained when determining whether the refrigerant is a saturated liquid.

In certain embodiments, the metering device is an expansion valve in a refrigerant cycle further including an evaporator, a compressor, and a condenser.

In certain embodiments, cooling the refrigerant upstream of the metering device includes exchanging heat between a coolant and the refrigerant upstream of the metering device.

In certain embodiments, the method further includes cooling the coolant by exchanging heat between the coolant and the refrigerant downstream of the metering device.

A method is provided for determining a degree of subcooling in a fluid. In one embodiment, the method includes flowing the fluid through a metering device, from a device inlet to a device outlet; measuring an inlet pressure of the fluid at the device inlet; and measuring an outlet pressure of the fluid at the device outlet. Further, the method includes determining the degree of subcooling in the fluid based on a difference between the inlet pressure and the outlet pressure.

In certain embodiments, determining the degree of subcooling in the fluid based on a difference between the inlet pressure and the outlet pressure comprises estimating a density correction factor Δ from equation (1):

$$m = A\sqrt{2(1+\Delta)\rho(P\text{in}-P\text{out})}$$

where: m is the device mass flow rate; A is the device effective flow area; ρ is the fluid density at saturation condition; $P_{in}$ is the pressure at the device inlet; and $P_{out}$ is the pressure at the device outlet. In certain embodiments, correlating the degree of subcooling to the density correction factor Δ includes determining the degree of subcooling by referencing paired density correction factors A and degrees of subcooling.

In certain embodiments, estimating the density correction factor Δ comprises estimating the density correction factor Δ based on an estimation algorithm.

In certain embodiments, the method further includes correlating a degree of subcooling to the estimated density correction factor Δ.

A refrigeration system is also provided. In one embodiment, the refrigeration system includes a refrigeration cycle including a compressor configured to compress a refrigerant, a condenser configured to condense the refrigerant received from the compressor, an expansion valve configured to expand the refrigerant received from the condenser, and an evaporator configured to evaporate the refrigerant received from the expansion valve. In an exemplary embodiment, the expansion valve has an expansion valve inlet and an expansion valve outlet. In an exemplary embodiment, the system further includes a heat exchanger configured to selectively cool the refrigerant at the expansion valve inlet. Further, in an exemplary embodiment, the system includes a pressure sensor device for determining the phase state of the refrigerant at the expansion valve inlet.

In certain embodiments of the system, the pressure sensor device is configured to detect an inlet pressure of the refrigerant at the expansion valve inlet and an outlet pressure of the refrigerant at the expansion valve outlet to determine the phase state of the refrigerant at the expansion valve inlet.

In certain embodiments of the system, determining the phase state of the refrigerant at the expansion valve inlet comprises estimating a density correction factor Δ from equation (1):

$$m = A\sqrt{(2(1+\Delta)\rho(P_{in}-P_{out}))}$$

where: m is the expansion valve mass flow rate; A is the expansion valve effective flow area; ρ is the liquid refrigerant density at saturation condition; $P_{in}$ is the pressure at the expansion valve inlet; and $P_{out}$ is the pressure at the expansion valve outlet; and the system further includes an estimation module, including a data processor, for estimating the density correction factor Δ.

In certain embodiments, the system further includes a coolant cycle for circulating a coolant. In such embodiments, the heat exchanger is configured to selectively cool the refrigerant at the expansion valve inlet by exchanging heat from the refrigerant to the coolant.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

As used herein, the word "exemplary" means "serving as an example, instance, or illustration". As used herein, "a," "an," or "the" means one or more unless otherwise specified. The term "or" can be conjunctive or disjunctive. Open terms such as "include," "including," "contain," "containing" and the like mean "comprising", but in certain embodiments may mean "consisting of". In certain embodiments, numbers in this description indicating amounts, ratios of materials, physical properties of materials, and/or use are may be understood as being modified by the word "about". The term "about" as used in connection with a numerical value and the claims denotes an interval of accuracy, familiar and acceptable to a person skilled in the art. In general, such interval of accuracy is ±10%. All numbers in this description indicating amounts, ratios of materials, physical properties of materials, and/or use may be understood as modified by the word "about," except as otherwise explicitly indicated.

The figures are in simplified schematic form and are not to precise scale. Further, terms such as "upper", "lower", "above," "over," "below," "under," "upward," "downward," et cetera, are used descriptively of the figures, and do not represent limitations on the scope of the subject matter, as defined by the appended claims. Any numerical designations, such as "first" or "second" are illustrative only and are not intended to limit the scope of the subject matter in any way. It is noted that while embodiments may be described herein with respect to automotive applications, those skilled in the art will recognize their broader applicability.

It should also be understood that, depending on the example, certain acts or events of any of the processes or methods described herein may be performed in a different sequence, may be added, merged, or left out altogether (e.g., all described acts or events may not be necessary to carry out the techniques).

In addition, while certain aspects of this disclosure are described as being performed by a single module or unit for purposes of clarity, it should be understood that the techniques of this disclosure may be performed by a combination of units or modules. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be configurable to be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

"Node/Port"—As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node). As used herein, a "port" means a node that is externally accessible via, for example, a physical connector, an input or output pin, a test probe, a bonding pad, or the like.

"Connected/Coupled"—The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although schematics may depict one exemplary arrangement of elements, additional intervening elements, devices, features, or components may be present in an embodiment of the depicted subject matter.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Embodiments herein are related to the monitoring of a fluid in a cycle, such as a refrigerant in a refrigeration cycle. While the fluid may be described herein as a refrigerant for convenience, the application is not limited to refrigeration systems or to refrigerants. In exemplary embodiments, the phase state and/or subcooling state of the fluids is monitored, and may be adjusted, at the inlet of a metering device, such as an expansion valve.

Embodiments herein may provide for determining the phase state of a fluid. In certain embodiments, it is desirable for the fluid to be a saturated liquid. Thus, a determination that the fluid is a two-phase vapor/liquid mixture may trigger a cooling process to cool the fluid to at least a saturated liquid condition.

Embodiments herein that maintain a single liquid phase of the fluid at the metering device inlet may provide for more efficient operation of the metering device.

Embodiments herein may provide for determining whether, and/or to what degree, a fluid is subcooled beyond its saturated liquid state. In such embodiments, a determination that the fluid is not subcooled to the desired degree may trigger a cooling process to further cool the fluid to the desired subcooled state.

Embodiments herein for maintaining subcooling of the fluid may be employed with various objectives. For example, in a fluid low charge detection process, determining that a fluid is becoming less subcooled at a stage may include that there is a fluid leak in the system. Also, for controls energy enhancement, certain systems may operate more efficiently at certain degrees of subcooling due to the energy needed to spin the compressor such that ensuring a selected degree of subcooling leads to energy savings. In controls performance enhancement, a selected level or degree of subcooling may provide better cooling/heating performance of the system and provide the ability to reach otherwise unattainable cooling temperature targets. For hardware damage prevention, ensuring that subcooling is maintained may prevent damage to hardware.

In general, certain embodiments provided herein use pressure variation over a metering device in order to detect subcooling. Traditionally, subcooling is determined by comparing a measured temperature value of the fluid with the saturation temperature of the fluid at the given pressure. However, this traditional method is limited to only measuring subcooling. It cannot measure how much cooling is needed to reach the saturated liquid state. In other words, it cannot measure "negative subcooling".

Embodiments described herein provide for the use of pressure measurement, while not requiring temperature measurement, to estimate negative subcooling, i.e., how far the state of the fluid is from the fluid's saturated-liquid line.

Figure 1:
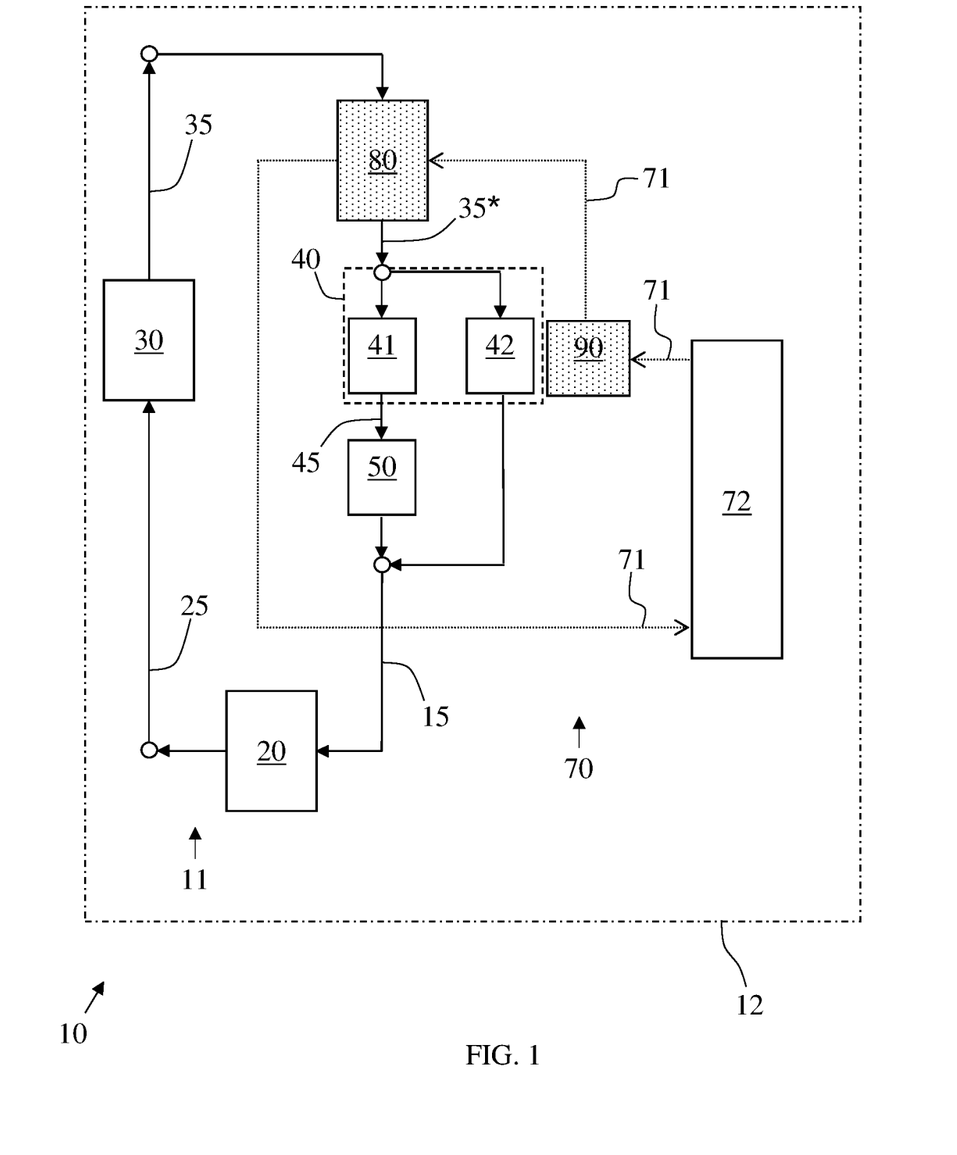
FIG. 1 is a schematic of a refrigeration system in accordance with an embodiment.

Referring now to FIG. 1, an exemplary refrigeration system 10 is illustrated. As shown, the refrigeration system 10 is a closed system providing for the typical flow of a refrigerant through refrigerant cycle 11 and may be controlled by a system control module 12 that is in communication with each component, or with selected components, therein. As shown, the refrigerant cycle 11 includes a compressor 20, a condenser 30, a metering device 40, such as an expansion valve or throttling device, and an evaporator 50. It is noted that FIG. 1 is a basic schematic and does not illustrate every specific feature that may be included in the refrigeration system 10. For example, condenser 30 may include a multi-condenser unit with separate refrigerant flow paths, multiple heat destinations or dumps. Likewise, various valves, including one-way or check valves, additional sensors, and other processing features, though not illustrated, may be included as is common.

Under good operating conditions, the refrigeration system 10 may operate as follows: the compressor 20 compresses the refrigerant or fluid to form a compressed fluid 25 as a relatively high temperature/high pressure vapor; the condenser 30 condenses the fluid to form a condensed fluid 35 as a relatively medium temperature/high pressure liquid; the metering device 40 expands the fluid to form an expanded fluid 45 as a relatively low temperature/low pressure mixed vapor/liquid; and the evaporator 50 evaporates the fluid to form an evaporated fluid 15 as a relatively medium temperature/low pressure vapor, which is introduced to the compressor 20. For cooling purposes, heat may be absorbed from the cycle during the evaporation stage.

Figure 2:
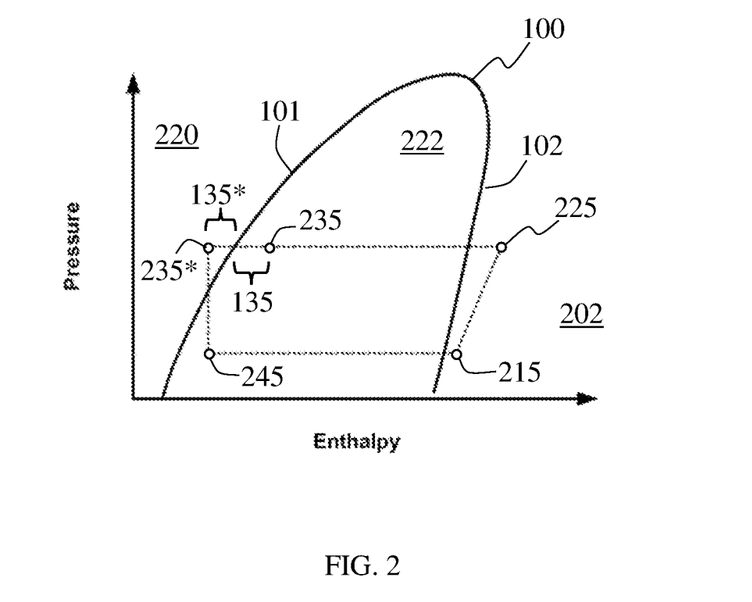
FIG. 2 is a Pressure-Enthalpy diagram (or Mollier diagram) showing the transition of the refrigerant of FIG. 1 to explain the operation of the refrigeration system of FIG. 1 in accordance with an embodiment.

FIG. 2 is a Pressure-Enthalpy diagram (Mollier diagram) showing the transition of the refrigerant. The diagram illustrates the "vapor/liquid dome" 100 under which the fluid is a vapor/liquid mixture. The dome 100 includes a saturated-liquid line 101 at which the fluid is saturated liquid, i.e., no vapor exists. Further, the dome 100 includes a saturated-vapor line 102 at which the fluid is saturated vapor, i.e., no liquid exists. To the left of the saturated-liquid line 101 is liquid region 220, where the fluid is liquid. To the right of the saturated-vapor line 102 is the vapor region 202, where the fluid is vapor. Between the saturated-liquid line 101 and the saturated-vapor line 102, i.e., under the dome 100, is a two-phase region 222, where the fluid is a mixture of vapor and liquid.

Cross-referencing FIG. 1 with FIG. 2, the operation of the refrigeration system 10 may be explained. Evaporated fluid 15 has a pressure and enthalpy represented by location 215 in FIG. 2. At the compressor 20, the fluid is compressed to form compressed fluid 25, having a pressure and enthalpy represented by location 225 in FIG. 2. Thus, the compressor 20 compresses a relatively medium temperature/low pressure vapor to a relatively high temperature/high pressure vapor. If there is no heat transfer to or from the surrounding environment, compression process is represented by an entropy line, such as the line extending from location 215 to location 225 in FIG. 2.

At the condenser 30, the relatively high temperature/high pressure fluid is condensed to form condensed fluid 35. While it is desirable that condensed fluid 35 be saturated liquid, such as is indicated by location 235* in FIG. 2, under non-optimal operating conditions condensed fluid 35 may instead be formed as a relatively medium temperature/high pressure two-phase state vapor/liquid mixture, such as is indicated by location 235 in FIG. 2.

As described below, the refrigeration system 10 provides for reducing or eliminating vapor from the condensed fluid 35, such that the condensed fluid 35 is saturated liquid when entering the metering device 40. Further embodiments provide for subcooling the condensed fluid 35 to a desired degree of subcooling, such as is represented by location 235* in FIG. 2, when entering the metering device 40.

At the metering device 40, the fluid is expanded to form expanded fluid 45, having a pressure and enthalpy represented by location 245 in FIG. 2. Thus, the metering device 40 expands relatively medium temperature/high pressure liquid to a relatively medium temperature/low pressure two-phase state vapor/liquid mixture.

At the evaporator 50, the fluid is evaporated to form evaporated fluid 15, having a pressure and enthalpy represented by location 215 in FIG. 2. Thus, the evaporator 50 evaporates relatively medium temperature/low pressure two-phase state vapor/liquid mixture to a relatively medium temperature/low pressure vapor.

Practice has shown that the condenser 30 may fail to produce a condensed fluid 35 as a single state liquid, as is desirable. Therefore, the refrigeration system 10 of FIG. 1 is provided with a coolant system 70. Specifically, a heat exchanger 80 is included in the path of the condensed fluid 35 downstream from the condenser 30 and upstream of the metering device 40, and the condensed fluid 35 passes therethrough. As shown, coolant 71 also passes through the exemplary heat exchanger 80. The heat exchanger 80 provides for the transfer of heat from the condensed fluid 35 to the coolant 71.

The heat exchanger 80 cools the fluid to form cooled fluid 35* such that cooled fluid 35* is a saturated liquid, i.e., all of the fluid is in the liquid phase. In certain embodiments, the cooled fluid 35* is cooled to its condensing temperature where any remaining vapor condenses to liquid. In other embodiments, the cooled fluid 35* is cooled to a temperature less than its condensing temperature, i.e., the cooled fluid 35* is subcooled, such as is illustrated by location 235* in FIG. 2.

Subcooling may increase the refrigeration effect by reducing the expansion or throttling loss at no additional specific work input. Further, subcooling may ensure that only liquid enters into the metering device leading to its efficient operation. Another practical advantage of subcooling is that there is less vapor at the inlet to the evaporator, which leads to lower pressure drop in the evaporator.

In certain embodiments, the coolant 71 may be cooled at an upstream location (in the coolant cycle) at a heat exchanger 90. Specifically, metering device 40 may include a first metering unit 41 and a second metering unit 42 and the condensed fluid 35 may be selectively split into two respective portions flowing through each metering unit as is shown in FIG. 1. Further, the second metering unit 42 may be contacted to heat exchanger 90 such that coolant flowing therethrough is cooled.

As is shown, after passing through heat exchanger 80, coolant 71 may be recycled back through coolant cycle complex 72, the details of which are not illustrated, before being fed back through upstream heat exchanger 90.

Figure 3:
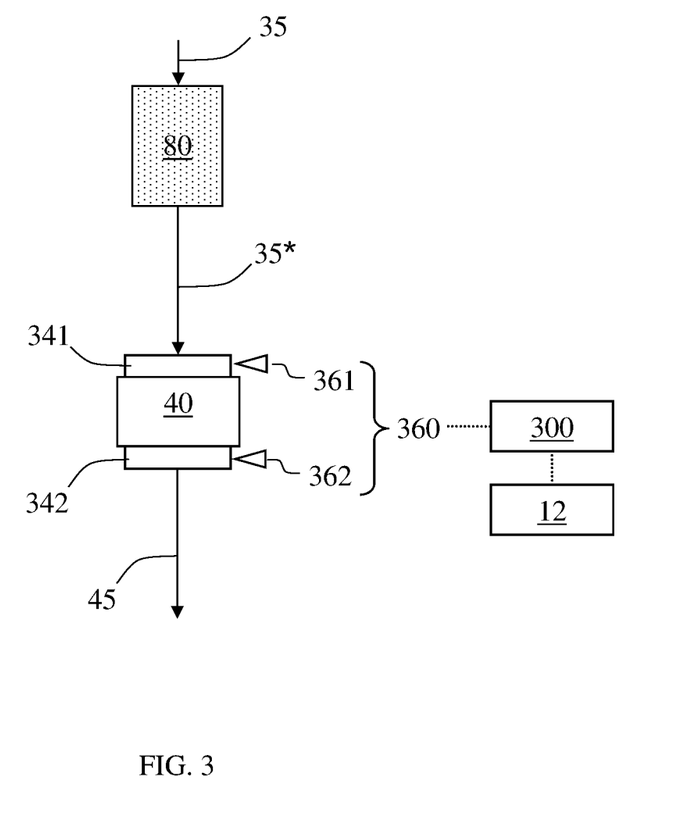
FIG. 3 is a schematic of an exemplary embodiment of a portion of the refrigeration system of FIG. 1, focused on the metering device and related sensing capability of the system in accordance with an embodiment.

Referring now to FIG. 3, more details of the flow of the condensed fluid 35 through the metering device 40 are illustrated. As shown in FIG. 3, the metering device 40 includes an inlet 341, through which the condensed fluid 35 or 35* enters the metering device 40, and an outlet, through which the expanded fluid 45 exits the metering device 40.

Further, the system 10 is provided with a pressure sensor device 360 to determine the phase state and/or the degree of subcooling of the condensed fluid 35 or 35*. As illustrated, the exemplary pressure sensor device 360 includes a sensor 361 for detecting the pressure of the fluid entering the metering device 40 at inlet 341, i.e., the upstream pressure. Also, the exemplary pressure sensor device 360 includes a sensor 362 for detecting the pressure of the fluid exiting the metering device 40 at outlet 342, i.e., the downstream pressure.

The pressure sensor device 360 may include an estimation module 300, as shown. An exemplary estimation module includes a data processor. As shown, the estimation module 300 may be part of, or in communication with, the system control module 12.

The estimation module 300 is configured to estimate a density correction factor $\Delta$ to be used for a selected determination. Specifically, after detecting the inlet pressure ($P_{in}$) and the outlet pressure ($P_{out}$) at the metering device, these values are used in the following equation (0), based on the energy conservation principle for the metering device:

$$m = A\sqrt{(2\rho'(Pin - Pout))}$$

where m is the mass flow rate across the metering device, or expansion valve, A is the effective flow area of the metering device, or expansion valve, and ρ' is the density of the fluid at the inlet.

Because the phase state of the fluid is unknown, the fluid density is unknown. However, the other variables in equation (0) may be determined. For example, the mass flow rate m can be modeled and may be assumed to be equal to the compressor mass flow rate. The effective flow area A may be calibrated for the specific device and is known ahead of operation.

Further, because the identity and or composition of the fluid is known, the density of the fluid when liquid at saturation condition is known and called ρ.

Therefore, upon determining the other variables, the difference between ρ', the actual density of the fluid at the inlet, and ρ, the density of the fluid when a liquid at saturation condition, can be determined through equation (1):

$$m = A\sqrt{(2(1+\Delta)\rho(Pin-Pout))}.$$

where density correction factor Δ represents the difference between ρ', the actual density of the fluid at the inlet, and ρ, the density of the fluid when a liquid at saturation condition. If Δ≥0, then no vapor exists in the fluid at the inlet, i.e., the phase state is saturated liquid. If Δ<0, then vapor exists in the fluid at the inlet, i.e., the phase state is mixed vapor/liquid.

Thus, the estimation module 300 of the pressure sensor device 360 may determine the phase state of the fluid at the inlet by estimating density correction factor Δ.

As is well known, an estimation algorithm can be used to estimate the density correction factor Δ in real time, i.e., simultaneously with measuring the inlet pressure ($P_{in}$) and the outlet pressure ($P_{out}$). An exemplary estimation algorithm is a Kalman filter, though other suitable processing algorithms may be used. In an exemplary embodiment, the estimation algorithm uses equation (2):

$$y = 1/2\left(\frac{m}{A}\right)^2 - \rho(Pin - Pout))$$

and equation (3):

$$c = \rho(Pin-Pout))$$

and the density correction factor Δ is estimated by equation (4):

$$y = \Delta * c$$

Further, in addition to determining the phase state of the fluid by estimating the density correction factor Δ, the density correction factor Δ can be used to identify the degree of subcooling of the fluid at the inlet or the degree of further cooling needed to reach saturation. Referring to FIG. 2, the degree of subcooling of the cooled fluid 35* is indicated as the distance 135* from location 235* to the saturated-liquid line 101; and the degree of further cooling needed to reach saturation is indicated as the distance 135 from location 235 to the saturated-liquid line 101.

From FIG. 2, it may be understood that "subcool", "subcooling", and "subcooled" refer to the state of a fluid that has been cooled beyond its saturated liquid condition, i.e., to the left of the saturated-liquid line 101—in other words, a fluid that has been cooled below its condensing temperature at a given pressure. Corresponding terminology is used to describe a fluid that has not yet been cooled to its saturated liquid condition. Specifically, "negative subcooled" or "negative subcooling" refers to the state of a fluid that has not been cooled to its saturated liquid condition, i.e., to the right of the saturated-liquid line 101.

In embodiments herein, the degree of subcooling (including both positive and negative subcooling) can be correlated to the value of the density correction factor Δ. The higher the value of the density correction factor Δ, the greater the degree of (positive) subcooling. The lower the value of the density correction factor Δ, the greater the degree of negative subcooling (and the greater than amount of vapor in the fluid). In exemplary embodiments, the specific correlation of the value of the density correction factor Δ and the degree of subcooling can be determined via experiment and saved in a memory or otherwise accessed by the system control module 12 and/or pressure sensor device 360 or estimation module 300. For example, a table of paired density correction factors Δ and degrees of subcooling specific to the fluid may be saved or otherwise accessible and correlating the value of the density correction factor Δ and the degree of sub cooling may be performed by referencing the table and matching the degree of subcooling to the estimated density correction factor Δ.

Cross-referencing FIGS. 1 and 3, one mode of operation of the system 10 may be understood. In an initial process, condensed fluid 35 may flow through heat exchanger 80 without being cooled. If operating conditions are ideal, this condition may continue. During operation, pressure sensor device 360 continues to measure the inlet pressure and outlet pressure at the metering device and the density correction factor Δ is continuously estimated in real time. As long as Δ remains equal to or greater than 0, then no vapor exists in the fluid at the inlet and the fluid need not be additionally cooled at heat exchanger 80.

When Δ is determined to be less than 0, then vapor exists in the fluid at the inlet. At that moment, the system control module 12 directs the heat exchanger 80 to cool the condensed fluid 35 to form cooled fluid 35*. Specifically, coolant 71 is cooled at heat exchanger 90 and is heat exchanged with fluid 35 at heat exchanger 80.

In the above mode of operation, the set value for comparison with the density correction factor Δ is 0. However, in another mode of operation, a different set value for comparison with the density correction factor Δ may be selected. For example, a degree of subcooling associated with a density correction factor Δ of 1 may be desired. Thus, additional cooling of the condensed fluid 35 may be triggered when the density correction factor Δ is less than 1 even though the density correction factor Δ is greater than 0, i.e., additional cooling can be triggered even when the fluid is already a saturated liquid in order to subcool the fluid to a desired degree, i.e., distance from the saturated liquid line in FIG. 2.

It is noted that the refrigeration system 10 as described provides for determining the phase state of the fluid without making any temperature measurements. The inlet pressure and outlet pressure at the metering device are monitored as described, and the mass flow rate may be modeled or estimated continuously. The effective flow area and fluid density at saturated condition are known.

Figure 4:
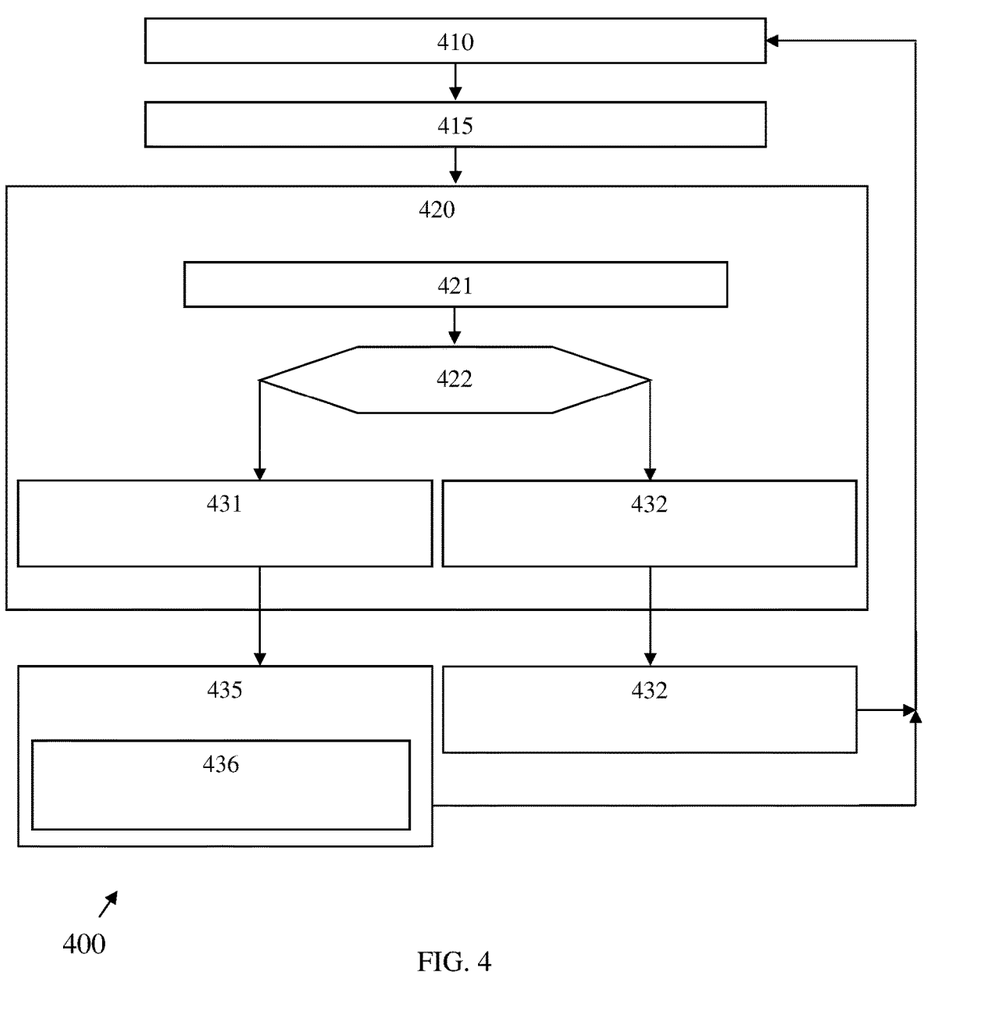
FIG. 4 is a flow chart illustrating a method for operating a refrigeration system in accordance with an embodiment.

Referring now to FIG. 4, a method 400 for operating a refrigeration system is described. At action 410, method 400 includes continuously flowing a fluid, such as a refrigerant, through a metering device, such as an expansion valve. Specifically, the fluid flows from a device inlet to a device outlet. In exemplary embodiments, flowing the fluid through the metering device includes flowing the fluid through a cycle including the metering device, an evaporator, a compressor, and a condenser.

Method 400 includes, at action 415, continuously calculating a pressure differential of the fluid across the metering device. In exemplary embodiments, calculating the pressure differential of the fluid across the metering device includes measuring an inlet pressure of the fluid at the inlet and measuring an outlet pressure of the fluid at the outlet. The pressure sensor device or system control module may calculate the pressure differential from the inlet pressure and outlet pressure.

Method 400 further includes, at action 420, continuously determining whether the fluid is a saturated liquid based on the pressure differential. In an exemplary embodiment, such determination is performed by estimating a density correction factor Δ from equation (1):

$$m = A\sqrt{2(1+\Delta)\rho(Pin - Pout)}$$

where m is the device mass flow rate; A is the device effective flow area; ρ is the fluid density at saturation condition; $P_{in}$ is the pressure at the device inlet; and $P_{out}$ is the pressure at the device outlet. In certain embodiments, estimating the density correction factor Δ includes estimating the density correction factor Δ based on an estimation algorithm as described above. In certain embodiments, the cycle includes a compressor having a compressor flow rate, and the device mass flow rate is assumed to be equal to the compressor flow rate. In certain embodiments, the device effective flow area is calibrated.

In certain embodiments, determining whether the fluid is a saturated liquid based on the pressure differential includes querying, at inquiry 422, whether the density correction factor Δ is less than 0. When the density correction factor Δ is less than 0, method 400 includes, at action 431, determining that the fluid is not a saturated liquid. When the density correction factor Δ is greater than or equal to 0, method 400 includes, at action 432, determining that the fluid is a saturated liquid.

When the fluid is determined to be a saturated liquid, method 400 continues with flowing the fluid through the device at action 410, in order to continuously monitor cycle conditions.

When the fluid is determined to not be a saturated liquid, i.e., to be a two-phase vapor/liquid mixture, method 400 includes, at action 435, performing a corrective measure. For example, the corrective measure may be cooling the fluid upstream of the metering device when the fluid is not a saturated liquid. For example, the fluid upstream of the metering device may be cooled by exchanging heat at a heat exchanger between a coolant and the fluid upstream of the metering device. To cool the fluid upstream of the metering device at action 435, method 400 may include, at action 436, cooling the coolant by exchanging heat between the coolant upstream of the heat exchanger and the fluid downstream of the metering device.

As noted above, method 400 includes determining whether the fluid is a saturated liquid without obtaining any measurement of temperature of the fluid.

Figure 5:
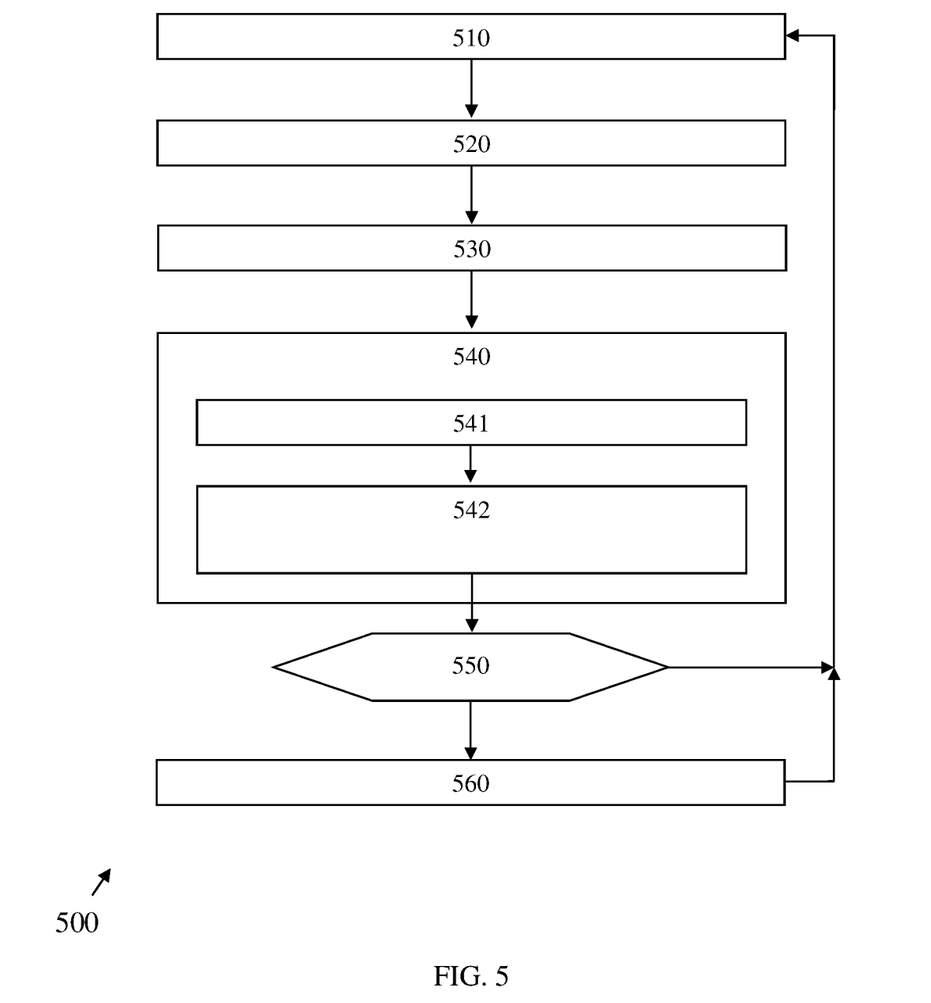
FIG. 5 is a flow chart illustrated a method for determining a degree of subcooling in accordance with an embodiment.

Referring now to FIG. 5, a method 500 for determining a degree of subcooling in a fluid is described. Method 500 includes, at action 510, flowing the fluid through a metering device, from a device inlet to a device outlet. Action 510 may be performed continuously. Method 500 includes, at action 520, measuring an inlet pressure of the fluid at the device inlet and, at action 530 measuring an outlet pressure of the fluid at the device outlet. Actions 520 and 530 may be performed simultaneously and continuously.

Method 500 further includes, at action 540, determining the degree of subcooling in the fluid based on a difference between the inlet pressure and the outlet pressure. In an exemplary embodiment, action 540 is performed, at action 541, by estimating a density correction factor Δ from equation (1):

$$m = A\sqrt{2(1+\Delta)\rho(Pin - Pout)}$$

where m is the device mass flow rate; A is the device effective flow area; ρ is the fluid density at saturation condition; $P_{in}$ is the pressure at the device inlet; and $P_{out}$ is the pressure at the device outlet. The density correction factor Δ may be estimated based on an estimation algorithm as described above.

Method 500 may further include, as part of action 540, action 542, which includes correlating a degree of subcooling to the estimated density correction factor Δ.

At inquiry 550, method 500 queries whether the degree of subcooling is acceptable. If yes, method 500 continues at action 510. If no, method 500 performs a correction measure at action 560. Method 500 then continues at action 510.

It is noted that method 500 may detect a positive or negative degree of subcooling. For example, the fluid may be cooled below its condensation temperature (positive subcooling) or may be at a temperature above its condensation temperature (negative subcooling). In either case, method 500 is able to detect the degree of subcooling through measuring the pressure differential across the device.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for operating a refrigeration cycle, the method comprising:
    flowing a refrigerant through a metering device, wherein the metering device is an expansion valve having an inlet and an outlet;
    calculating a pressure differential of the refrigerant across the metering device by measuring an inlet pressure of the refrigerant at the inlet and measuring an outlet pressure of the refrigerant at the outlet;
    determining that the refrigerant is not a saturated liquid based on the pressure differential by estimating a density correction factor; and
    in response to determining that the refrigerant is not a saturated liquid, cooling the refrigerant upstream of the metering device.

2. The method of claim 1 wherein determining that the refrigerant is not a saturated liquid based on the pressure differential comprises estimating the density correction factor Δ from equation (1):

$$m = A\sqrt{2(1+\Delta)\rho(Pin - Pout)}$$

where: m represents expansion valve mass flow rate;
A represents expansion valve effective flow area;
ρ represents liquid refrigerant density at saturation condition;
$P_{in}$ represents pressure at the inlet; and
$P_{out}$ represents pressure at the outlet.

3. The method of claim 2 wherein determining that the refrigerant is not a saturated liquid based on the pressure differential comprises:
querying whether the density correction factor Δ is less than 0; and
when the density correction factor Δ is less than 0, determining that the refrigerant is not a saturated liquid.

4. The method of claim 2 wherein estimating the density correction factor Δ comprises estimating the density correction factor Δ based on an estimation algorithm.

5. The method of claim 2 wherein the refrigeration cycle includes a compressor having a compressor flow rate, and wherein the expansion valve mass flow rate is assumed to be equal to the compressor flow rate, and wherein the expansion valve effective flow area is calibrated.

6. The method of claim 1 wherein no measurement of temperature of the refrigerant is obtained when determining that the refrigerant is not a saturated liquid.

7. The method of claim 1 wherein the metering device is an expansion valve in a refrigerant cycle further including an evaporator, a compressor, and a condenser.

8. The method of claim 1 wherein cooling the refrigerant upstream of the metering device comprises exchanging heat between a coolant and the refrigerant upstream of the metering device.

9. The method of claim 8 further comprising cooling the coolant by exchanging heat between the coolant and the refrigerant downstream of the metering device.

10. A refrigeration system comprising:
a refrigeration cycle including:
a compressor configured to compress a refrigerant;
a condenser configured to condense the refrigerant received from the compressor;
an expansion valve configured to expand the refrigerant received from the condenser,
wherein the expansion valve has an expansion valve inlet and an expansion valve outlet; and
an evaporator configured to evaporate the refrigerant received from the expansion valve;
a heat exchanger configured to selectively cool the refrigerant at the expansion valve inlet;
a pressure sensor device configured to calculate a pressure differential of the refrigerant between the expansion valve inlet and expansion valve outlet; and
a system control module configured to determine that the refrigerant is not a saturated liquid based on the pressure differential, and configured to cool the refrigerant upstream of the expansion valve in response to determining that the refrigerant is not a saturated liquid.

11. The system of claim 10 wherein the pressure sensor device is configured to detect an inlet pressure of the refrigerant at the expansion valve inlet and an outlet pressure of the refrigerant at the expansion valve outlet to calculate the pressure differential of the refrigerant between the expansion valve inlet and expansion valve outlet.

12. The system of claim 11 wherein the system control module is configured to determine that the refrigerant is not a saturated liquid based on the pressure differential by estimating a density correction factor Δ from equation (1):

$$m = A\sqrt{2(1+\Delta)\rho(P_{in}-P_{out})}$$

where: m represents expansion valve mass flow rate;
A represents expansion valve effective flow area;
ρ represents liquid refrigerant density at saturation condition;
$P_{in}$ represents pressure at the expansion valve inlet; and
$P_{out}$ represents pressure at the expansion valve outlet; and
wherein the system control module further comprises an estimation module, including a data processor, for estimating the density correction factor Δ.

13. The system of claim 10 further comprising a coolant cycle for circulating a coolant, wherein the heat exchanger is configured to selectively cool the refrigerant at the expansion valve inlet by exchanging heat from the refrigerant to the coolant.

14. A method for operating a refrigeration cycle, the method comprising:
flowing a refrigerant through a metering device;
calculating a pressure differential of the refrigerant across the metering device; and
determining whether the refrigerant is a saturated liquid based on the pressure differential by estimating a density correction factor.

15. The method of claim 14 wherein determining whether the refrigerant is a saturated liquid based on the pressure differential by estimating a density correction factor comprises determining that the refrigerant is not a saturated liquid, and wherein the method further comprises cooling the refrigerant upstream of the metering device.

16. The method of claim 14 wherein estimating a density correction factor comprises estimating a density correction factor Δ from equation (1):

$$m = A\sqrt{2(1+\Delta)\rho(P_{in}-P_{out})}$$

where: m represents expansion valve mass flow rate;
A represents expansion valve effective flow area;
ρ represents liquid refrigerant density at saturation condition;
$P_{in}$ represents pressure at an expansion valve inlet; and
$P_{out}$ represents pressure at an expansion valve outlet.

17. The method of claim 1, further comprising determining a degree of subcooling in the refrigerant based on the pressure differential.

18. The method of claim 17 wherein determining the degree of subcooling in the refrigerant based on the pressure differential comprises estimating a density correction factor Δ from equation (1):

$$m = A\sqrt{2(1+\Delta)\rho(P_{in}-P_{out})}$$

where: m represents device mass flow rate;
A represents device effective flow area;
ρ represents fluid density at saturation condition;
$P_{in}$ represents pressure at a device inlet; and
$P_{out}$ represents pressure at a device outlet.

* * * * *